United States Patent
Cao et al.

(10) Patent No.: US 8,805,342 B2
(45) Date of Patent: Aug. 12, 2014

(54) CONTENT SHARING FOR MOBILE DEVICES

(75) Inventors: Tao Cao, Redmond, WA (US); Antonio Winslow Fernando, Issaquah, WA (US); David Charles Huang, Bellevue, WA (US); Murali Narayanan, Redmond, WA (US); Yong Zhong Wang, Sammamish, WA (US); Dennis Joseph Thompson, Geneva, IL (US)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 12/695,156

(22) Filed: Jan. 27, 2010

(65) Prior Publication Data

US 2011/0183655 A1 Jul. 28, 2011

(51) Int. Cl.
*H04M 3/42* (2006.01)
*G06F 15/16* (2006.01)

(52) U.S. Cl.
USPC ........................................ 455/414.2; 709/217

(58) Field of Classification Search
USPC ...................... 455/414.2, 3.06, 466; 709/217; 358/1.15, 402, 1.18
See application file for complete search history.

(56) References Cited

U.S. PATENT DOCUMENTS

| 5,953,688 | A | * | 9/1999 | Su et al. ........................ 702/185 |
| 2002/0094787 | A1 | | 7/2002 | Avnet et al. |
| 2002/0112019 | A1 | | 8/2002 | Watanabe |
| 2006/0189349 | A1 | | 8/2006 | Montulli et al. |
| 2006/0234762 | A1 | | 10/2006 | Ozluturk |
| 2007/0156434 | A1 | * | 7/2007 | Martin et al. ...................... 705/1 |
| 2007/0159651 | A1 | * | 7/2007 | Disario et al. ............... 358/1.15 |
| 2007/0236727 | A1 | * | 10/2007 | Proust et al. .................. 358/1.15 |
| 2008/0275960 | A1 | * | 11/2008 | Myllyla et al. ................ 709/217 |
| 2008/0299997 | A1 | | 12/2008 | Klassen et al. |
| 2009/0100096 | A1 | | 4/2009 | Erlichson et al. |
| 2009/0111375 | A1 | * | 4/2009 | Burns et al. .................. 455/3.06 |
| 2009/0164897 | A1 | * | 6/2009 | Amer-Yahia et al. ......... 715/703 |

OTHER PUBLICATIONS

Awan Akhtar Shahzad, "Automated Content Sharing in Extended Homes through Mobile Devices",Retreived at <<http://www.cs.uta.fi/research/theses/masters/Awan_Shahzad.pdf>>, Jun. 2008, pp. 67.
"PhotoWALL", Retreived at <<http://msn.photowall.com/pages/about>>,Oct. 23, 2009, pp. 2.
"Auto Send Media 2.2.1", Retreived at <<http://handheld.softpedia.com/get/Internet-Utilities/Email/Auto-Send-Media-78619.shtml>>, Oct. 23, 2009, pp. 2.

* cited by examiner

*Primary Examiner* — Opiribo Georgewill
(74) *Attorney, Agent, or Firm* — Patricia E. Sellers; Micky Minhas; Zete Law, P.L.L.C.

(57) ABSTRACT

Aspects of the subject matter described herein relate to content sharing for mobile devices. In aspects, images that are created using mobile devices may be automatically uploaded to one or more targets. In addition, images created on the one or more targets may be automatically downloaded to the mobile device based on one or more criteria. A service facilitates transfer of images in both directions and includes a pluggable architecture in which forwarders for new targets may be added.

20 Claims, 7 Drawing Sheets

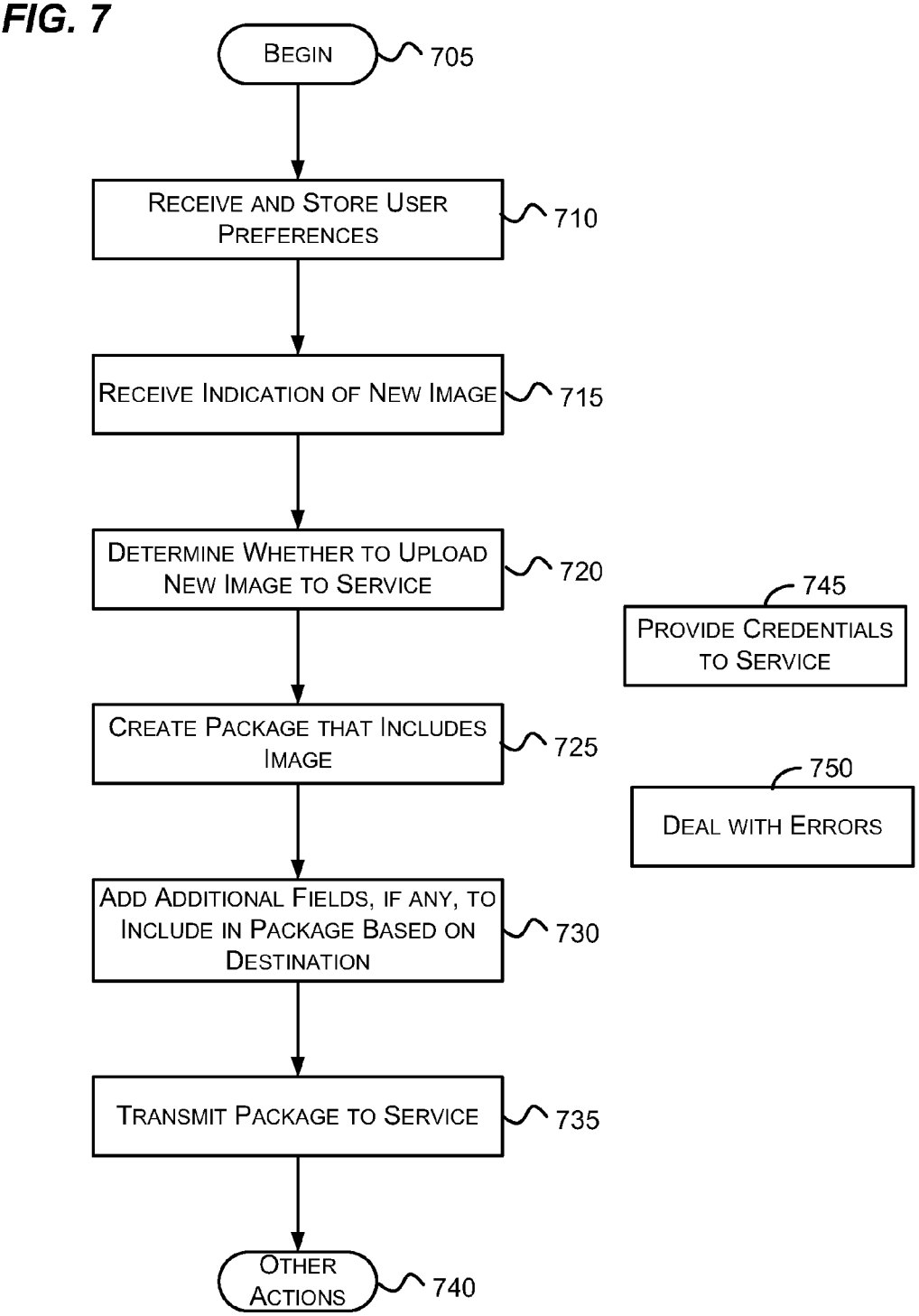

CONTENT SHARING FOR MOBILE DEVICES

BACKGROUND

In today's world, people use a variety of devices to take pictures and create other content. For example, a person may use a cell phone, a digital camera, a film-based camera, art programs, and the like to create content. At the same time, a person may wish to share and manage content created from these various devices. Ways of sharing the content have been limited and difficult to use.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to content sharing for mobile devices. In aspects, images that are created using mobile devices may be automatically uploaded to one or more targets. In addition, images created on the one or more targets may be automatically downloaded to the mobile device based on one or more criteria. A service facilitates transfer of images in both directions and includes a pluggable architecture in which forwarders for new targets may be added.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIG. 7 is a flow diagram that generally represents exemplary actions that may occur when content is uploaded from a mobile device in accordance with aspects of the subject matter described herein.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
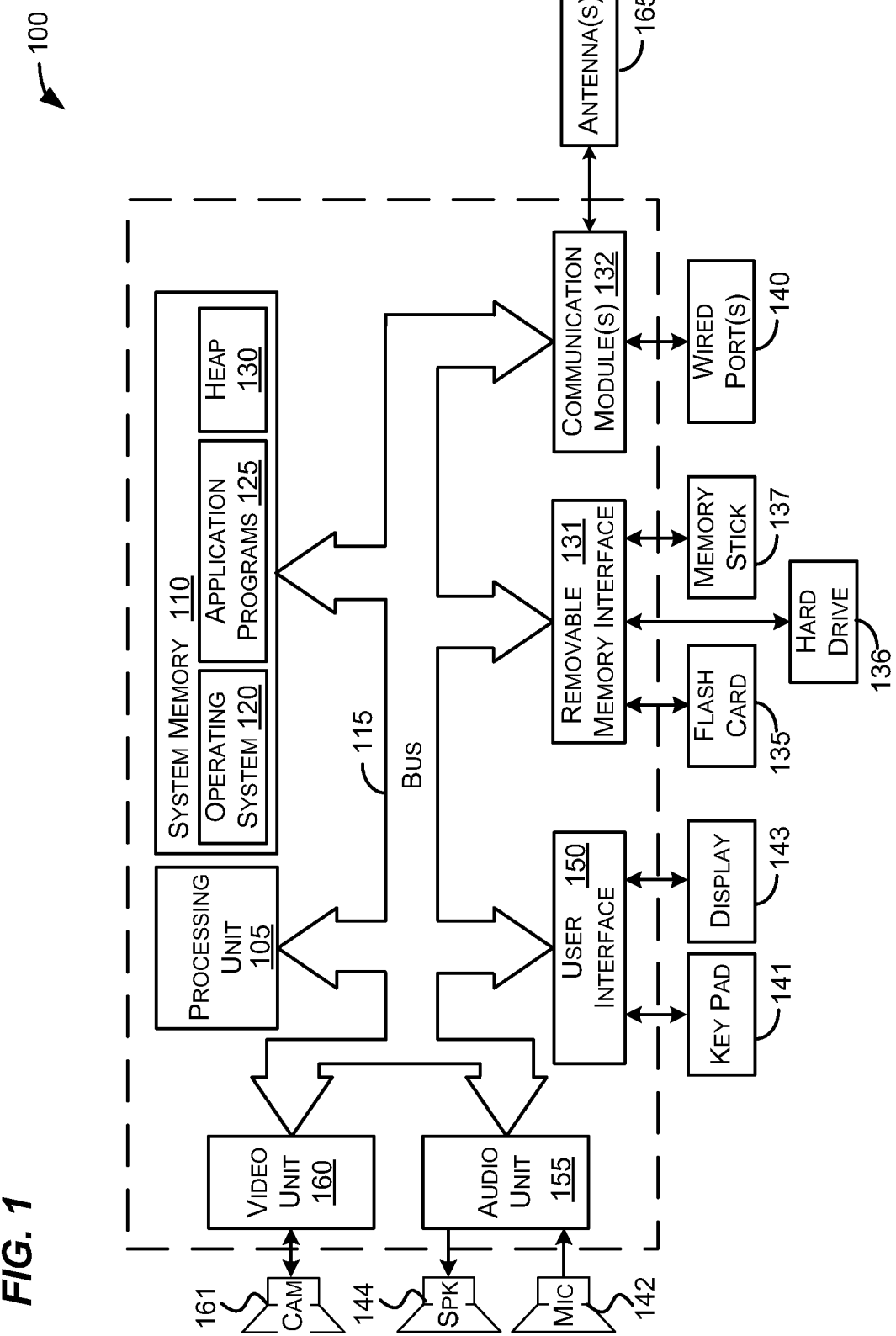
FIG. 1 is a block diagram representing an exemplary general-purpose computing environment into which aspects of the subject matter described herein may be incorporated.

FIG. 1 illustrates an example of a suitable mobile device 100 on which aspects of the subject matter described herein may be implemented. The mobile device 100 is only one example of a device and is not intended to suggest any limitation as to the scope of use or functionality of aspects of the subject matter described herein. Neither should the mobile device 100 be interpreted as having any dependency or requirement relating to any one or combination of components illustrated in the exemplary mobile device 100.

With reference to FIG. 1, an exemplary device for implementing aspects of the subject matter described herein includes a mobile device 100. In some embodiments, the mobile device 100 comprises a cell phone, a handheld device that allows voice communications with others, some other voice communications device, or the like. In some embodiments, a mobile device 100 may be equipped with a camera 161 for taking pictures, although in other embodiments, the mobile device 100 may not include the camera 161. In other embodiments, the mobile device 100 comprises a personal digital assistant (PDA), hand-held gaming device, other hand held device, printer, appliance including a set-top, media center, or other appliance, automobile-embedded or attached computing devices, other mobile devices, or the like. Some exemplary devices that may implement the mobile device 100 include the iPod Touch® and the iPhone produced by Apple Inc., BlackBerry® devices produced by Research in Motion, the Zune® produced by Microsoft Corporation, Nokia Symbian devices produced by Nokia, other smart phones and cell phones produced by various manufacturers, and various other devices. The exemplary devices above are not intended to be all-inclusive or exhaustive. Indeed, based on the teachings herein, those skilled in the art may recognize many other devices now existing or developed in the future that may be used without departing from the spirit or scope of aspects of the subject matter described herein.

Components of the mobile device 100 may include a processing unit 105, system memory 110, and a bus 115 that couples various system components including the system memory 110 to the processing unit 105. The bus 115 may include any of several types of bus structures including a memory bus, memory controller, a peripheral bus, and a local bus using any of a variety of bus architectures, and the like. The bus 115 allows data to be transmitted between various components of the mobile device 100.

The mobile device 100 may include a variety of computer-readable media. Computer-readable media can be any available media that can be accessed by the mobile device 100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 100.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, WiFi, WiMAX, other electromagnetic wireless frequencies used by various mobile devices and protocols, and other wireless media. Combinations of any of the above should also be included within the scope of computer-readable media.

The system memory 110 includes computer storage media in the form of volatile and/or nonvolatile memory and may include read only memory (ROM) and random access memory (RAM). On a mobile device such as a cell phone, operating system code 120 is sometimes included in ROM although, in other embodiments, this is not required. Similarly, application programs 125 are often placed in RAM although again, in other embodiments, application programs may be placed in ROM or in other computer-readable memory. The heap 130 provides memory for state associated with the operating system code 120 and the application programs 125. For example, the operating system code 120 and application programs 125 may store variables and data structures in the heap 130 during their operations.

The mobile device 100 may also include other removable/non-removable, volatile/nonvolatile memory. By way of example, FIG. 1 illustrates a flash card 135, a hard disk drive 136, and a memory stick 137. The hard disk drive 136 may be miniaturized to fit in a memory slot, for example. The mobile device 100 may interface with these types of non-volatile removable memory via a removable memory interface 131, or may be connected via a universal serial bus (USB), IEEE 1394, one or more of the wired port(s) 140, or antenna(s) 165. In these embodiments, the removable memory devices 135-137 may interface with the mobile device via the communications module(s) 132. In some embodiments, not all of these types of memory may be included on a single mobile device. In other embodiments, one or more of these and other types of removable memory may be included on a single mobile device.

In some embodiments, the hard disk drive 136 may be connected in such a way as to be more permanently attached to the mobile device 100. For example, the hard disk drive 136 may be connected to an interface such as parallel advanced technology attachment (PATA), serial advanced technology attachment (SATA), or otherwise, which may be connected to the bus 115. In such embodiments, removing the hard drive may involve removing a cover of the mobile device 100 and removing screws or other fasteners that connect the hard drive 136 to support structures within the mobile device 100.

The removable memory devices 135-137 and their associated computer storage media, discussed above and illustrated in FIG. 1, provide storage of computer-readable instructions, program modules, data structures, and other data for the mobile device 100. For example, the removable memory device 135-137 may store images taken by the mobile device 100, voice recordings, contact information, programs, data for the programs, and so forth.

A user may enter commands and information into the mobile device 100 through input devices such as a key pad 141 and the microphone 142. In some embodiments, the display 143 may be touch-sensitive screen and may allow a user to enter commands and information thereon. The key pad 141 and display 143 may be connected to the processing unit 105 through a user input interface 150 that is coupled to the bus 115, but may also be connected by other interface and bus structures, such as the communications module(s) 132 and wired port(s) 140.

A user may communicate with other users via speaking into the microphone 142 and via text messages that are entered on the key pad 141 or a touch sensitive display 143, for example. The audio unit 155 may provide electrical signals to drive the speaker 144 as well as receive and digitize audio signals received from the microphone 142.

The mobile device 100 may include a video unit 160 that provides signals to drive a camera 161. The video unit 160 may also receive images obtained by the camera 161 and provide these images to the processing unit 105 and/or memory included on the mobile device 100. The images obtained by the camera 161 may comprise video, one or more images that do not form a video, or some combination thereof.

The communications module(s) 132 may provide signals to and receive signals from one or more antenna(s) 165. One of the antenna(s) 165 may transmit and receive messages for a cell phone network. Another antenna may transmit and receive Bluetooth® messages. Yet another antenna may transmit and receive network messages via a wireless Ethernet network standard.

In some embodiments, a single antenna may be used to transmit and/or receive messages for more than one type of network. For example, a single antenna may transmit and receive voice and packet messages.

When operated in a networked environment, the mobile device 100 may connect to one or more remote devices. The remote devices may include a personal computer, a server, a router, a network PC, a cell phone, a peer device or other common network node that may include many or all of the elements described above relative to the mobile device 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server is sometimes used herein, it will be recognized that this term may also encompass a client, a set of one or more processes distributed on one or more computers, one or more stand-alone storage devices, a set of one or more processes on one or more mobile devices, a set of one or more other devices, a combination of one or more of the above, and the like.

Although the terms "mobile device" and "server" are sometimes used herein, it is to be understood, that a mobile device may be implemented on a machine that has hardware and/or software that is typically associated with a server and that likewise, a server may be implemented on a machine that has hardware and/or software that is typically associated with a desktop, personal, or mobile device. Furthermore, a mobile device may at times act as a server and vice versa. In an embodiment, a mobile device and a server may, at various times, both be peers, servers, or clients. In one embodiment, mobile device and server may be implemented on the same physical machine.

Figure 2:
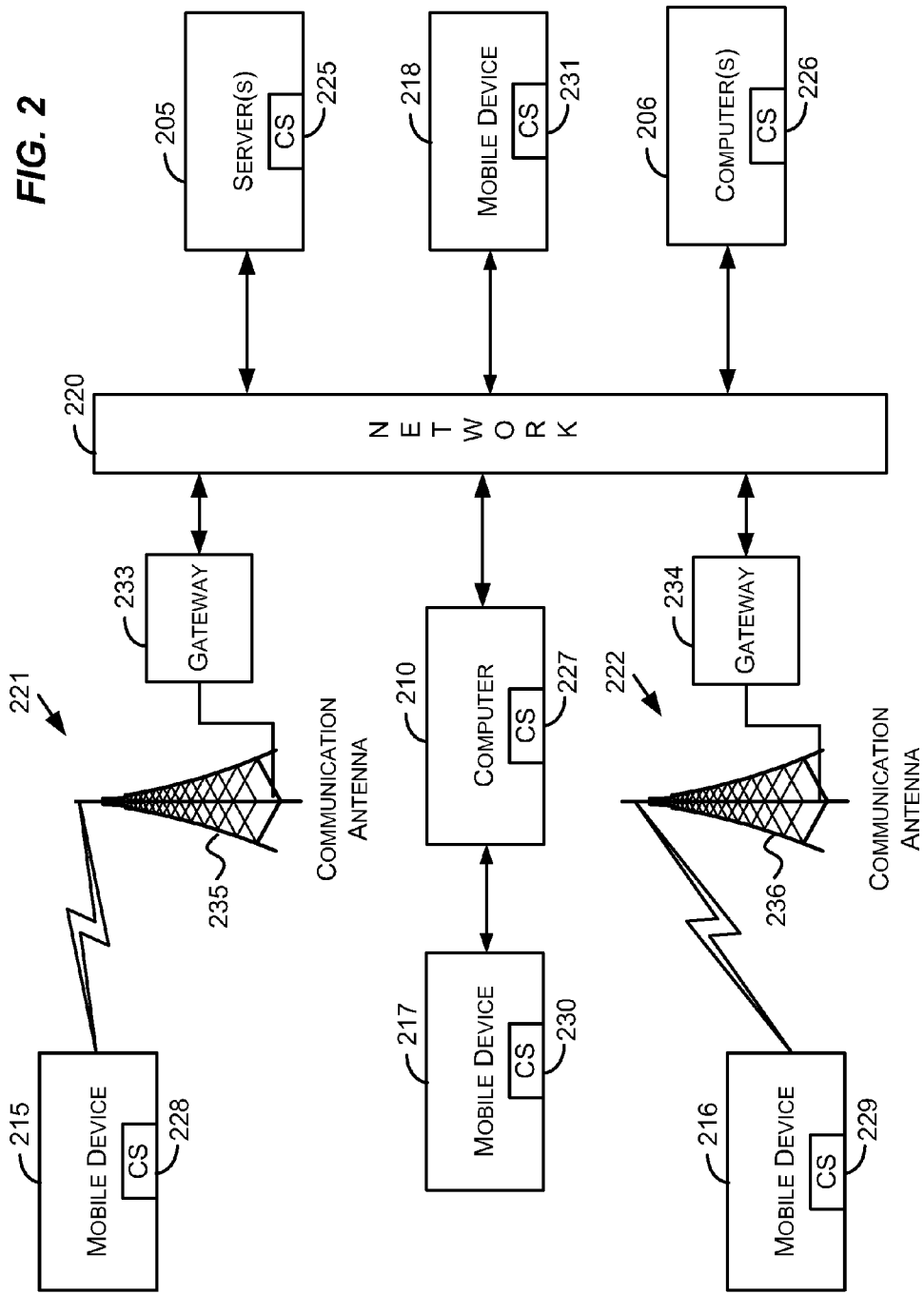
FIG. 2 is a block diagram that represents an exemplary environment in which aspects of the subject matter described herein may be implemented.

FIG. 2 is a block diagram that represents an exemplary environment in which aspects of the subject matter described herein may be implemented. The environment includes server(s) 205, computer(s) 206, computer 210, and mobile devices 215-218 (hereinafter sometimes collectively referred to as the entities) and may include other components (not shown). Sometimes a server, computer, or mobile device is referred to as an entity, and two or more of the servers, computers, or mobile devices may be referred to as entities. The entities may communicate with each other via various networks including intra- and inter-office networks, telephone lines, the network 220, wireless networks 221 and 222, other wireless and wired networks, and the like. In one embodiment, the network 220 may comprise the Internet.

A wireless network (e.g., each of the wireless networks 235 and 236) may comprise one or more components that are capable of communicating with mobile devices wirelessly. The wireless networks 221 and 222 may be connected to or incorporated in the gateways 233 and 234, respectively. A gateway may function as a conduit to allow communications to and from the mobile devices 215 and 216 to entities connected to the network 220. A wireless network may function according to one or more various protocols including a cellular protocol, Bluetooth® (also known as IEEE 802.15), those defined by IEEE 802.11, and other wireless network protocols, for example. In cellular network implementations, the gateways 233-234 may be implemented as part of or separate from mobile telephone switching offices that may control the operation of a cellular sub-system.

A mobile device (e.g., the mobile device 217) may connect to one or more other entities via the computer 210. The mobile device 217 may be connected to the computer via a wired (e.g., Universal Serial Bus (USB), IEEE 1394 (also known as "FireWire"), or some other wired protocol) or wireless (e.g., Bluetooth, radio, or some other wireless protocol) connection. In some embodiments, the mobile device 217 may access content from the computer 210 and may only connect to the computer 210 and not to the other entities illustrated in FIG. 2 to access the content. Access as used herein may include reading data, writing data, deleting data, updating data, a combination including one or more of the above, and the like.

A mobile device (e.g., the mobile device 218) may be able to connect directly to the network 220. For example, the mobile device 218 may have a port that allows an Ethernet cable to connect to the mobile device 218. The mobile device 218 may use the Ethernet cable to connect to a router, switch, or the like that is part of the network 220. As another example, the mobile device 218 may have an antenna that allows the mobile device 218 to connect to a wireless router that is part of the network 220.

Wherever the term "mobile device" is used herein, in one embodiment, this term means a device that is designed to be held in one or two hands while interacting with the device. Such devices include cell phones, PDAs, hand held gaming devices, and the like. In other embodiments, this term means a computing device that is designed to generally not be held in human hands while being used. Such devices include personal computers, lap top computers, notebook computers, automobile-embedded or attached computing devices, other mobile devices, computing appliances, printers, and the like. In one embodiment, the mobile devices 215-218 may be implemented as described in conjunction with the mobile device 100 of FIG. 1.

Each of the server(s) 205, the computer(s) 206, and the computer 210 may be implemented on one or more computers, and there is no intention to limit the types of computers to those thought particularly as server computers or client computers. Indeed a computer that acts as a home computer may at times act as a server computer and vice versa. Furthermore, in an embodiment, a server may indeed be another mobile device and may share content with a requesting mobile device in a peer-to-peer manner.

The server(s) 205, computer(s) 206, computer 210, and the mobile devices 215-218 may include content sharing components 226-231, respectively. The content sharing components 226-231 may comprise components that allow the entities to access or provide content. On the mobile device 215, for example, the content sharing components 228 may comprise, for example, a component that allows a user to configure content upload and download settings, a component that allows the mobile device 215 to upload pictures to a server, a component that allows the mobile device 215 to download pictures, and the like.

The content sharing components 228 may also comprise interface components that allow the application to obtain updated content from the computer 210, server(s) 205, or computer(s) 206. The content sharing components 225-226 may include a web server, portal, application server, database, FTP site, other content providing software, related software, or the like. The content sharing components 227 of the computer 210 may include components that provide content to the mobile device 217 as well as components that access content from the server(s) 205 or computer(s) 206.

As used herein, the term component is to be read to include all or a portion of a device, a collection of one or more software modules or portions thereof, some combination of one or more software modules or portions thereof and one or more devices or portions thereof, and the like.

The term "process" and its variants as used herein may include one or more traditional processes, threads, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device.

Although the environment described above includes various numbers of each of the entities and related infrastructure, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Content Sharing

Figure 3:
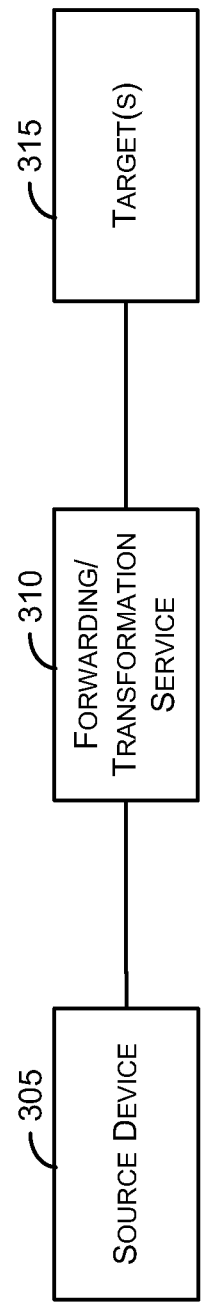
FIG. 3 is a block diagram that represents an exemplary environment in which aspects of the subject matter described herein may be implemented.

As mentioned previously, ways of sharing content have been limited and difficult to use. FIG. 3 is a block diagram that represents an exemplary environment in which aspects of the subject matter described herein may be implemented. The environment includes source device 305, forwarding/transformation service 310, and target(s) 315.

The source device 305 includes any device that seeks to send content to another device. Referring to FIG. 2, in one embodiment, the source device 305 may comprise one of the mobile devices 215-218. In other embodiments, the source device 305 may comprise one of the other entities of FIG. 2.

For example, when the user is creating content using a mobile device, the source device 305 may comprise a cell phone, laptop, or other mobile device mentioned previously.

A mobile device, however, may also be the target for content from other sources. For example, the source may include an online service such as Windows Live Service, a social networking service such as FaceBook, MySpace, LinkedIn, or other social networking service, an image hosting service of images that may include video, a photo sharing service, service(s) hosted on one or more home or other computer(s), any other service that may include images, or the like.

For example, a user may have an account with one or more online services. The user and/or others may store images on these accounts. When new images are added to any of the online accounts, a user may desire (and indicate during configuration, for example) to have the images sent to the user's mobile device or another target. When an online service receives new images, a server hosting these images may act as the source device 305 and transfer the images to the user's mobile device.

As another example, a user may have one or more computers at home or work. These computers may host images created by family, friends, coworkers, or others. When a new image is created or placed on one of these computers, a component on the computer may attempt to inform the user's mobile device or another target of the new content. Depending on the user's preferences, the new image may then be transferred to one or more targets (e.g., a mobile device, other home or work computers, other online services, or the like).

Figure 4:
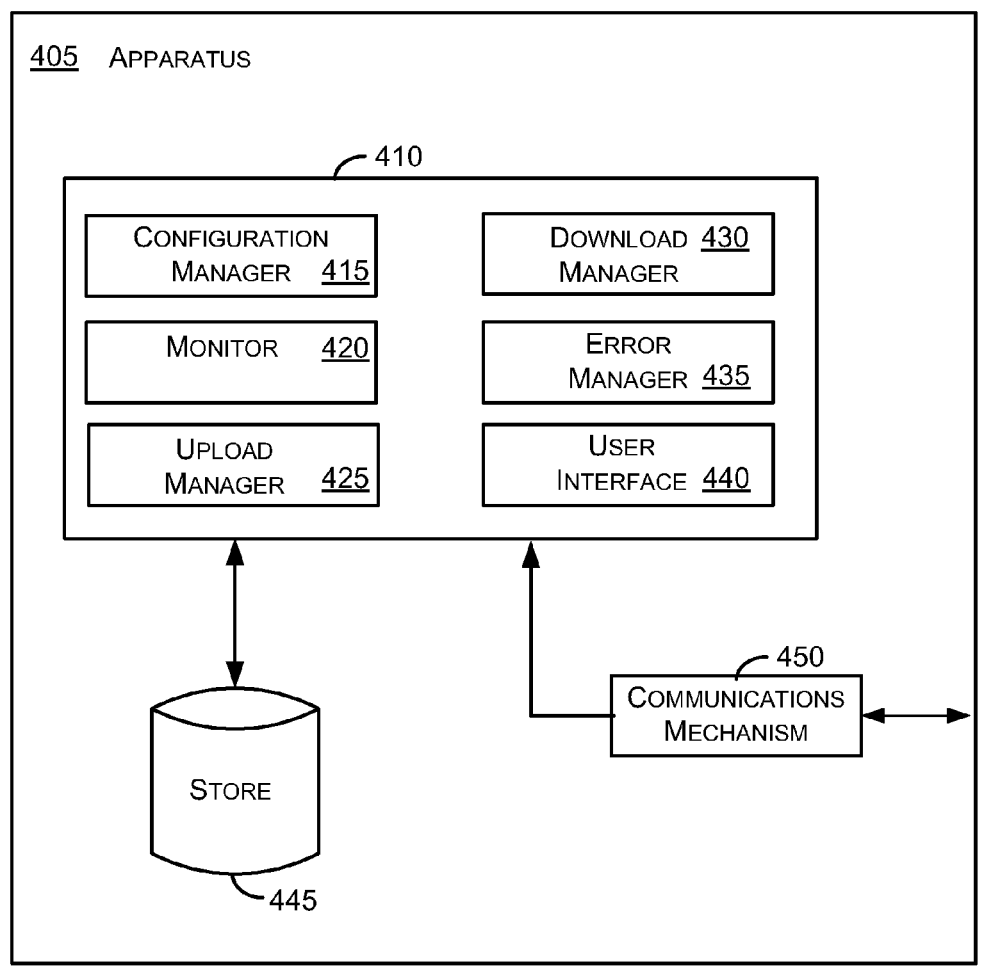
FIG. 4 is a block diagram that represents an apparatus configured in accordance with aspects of the subject matter described herein.

The source device 305 may be implemented such that it has components similar to that shown in FIG. 4. FIG. 4 is a block diagram that represents an apparatus configured in accordance with aspects of the subject matter described herein. The components illustrated in FIG. 4 are exemplary and are not meant to be all-inclusive of components that may be needed or included. In other embodiments, the components and/or functions described in conjunction with FIG. 4 may be included in other components (shown or not shown) or placed in subcomponents without departing from the spirit or scope of aspects of the subject matter described herein. In some embodiments, the components and/or functions described in conjunction with FIG. 4 may be distributed across multiple devices.

Turning to FIG. 4, the apparatus 405 may include content sharing components 410, a store 445, a communications mechanism 450, and other components (not shown). The content sharing components 410 may include a configuration manager 415, a monitor 420, an upload manager 425, a download manager 430, an error manager 435, a user interface 440, and other components (not shown).

The apparatus 405 may correspond to any of the mobile devices 215-218, the sever(s) 205, computer(s) 206, computer 210 of FIG. 2 and may be implemented on or using the same or similar device(s) upon which one of those entities may be implemented. For example, the apparatus 405 may be implemented on or as a mobile device (e.g., as the computer 100 of FIG. 1).

The communications mechanism 450 allows the apparatus 405 to communicate with other entities. For example, the communications mechanism 450 may allow the apparatus 405 to communicate with entities illustrated in FIG. 2. The communications mechanism 450 may be a communication module(s) 132, antenna(s) 165, or any other mechanism for establishing communications as described in conjunction with FIG. 1.

The store 445 is any storage media capable of providing access to data. The store may include volatile memory (e.g., a cache) and non-volatile memory (e.g., a persistent storage). The term data is to be read broadly to include anything that may be represented by one or more computer storage elements. Logically, data may be represented as a series of 1's and 0's in volatile or non-volatile memory. In devices that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The store 445 may comprise hard disk storage, other non-volatile storage, volatile memory such as RAM, other storage, some combination of the above, and the like and may be distributed across multiple devices. The store 445 may be external, internal, or include components that are both internal and external to the apparatus 405.

The configuration manager 415 allows a user of the apparatus 405 to indicate user preferences for content sharing for the apparatus 405. For example, a user may indicate whether content is to be automatically uploaded to a forwarding/transformation service (e.g., such as the forwarding/transformation service 310 of FIG. 3). For example, with a camera-equipped cell phone or other mobile device, a user may desire to have pictures automatically uploaded to the service for forwarding to various destination targets. A user may also indicate one or more target(s) to which new content is to be sent when available. The configuration manager 415 may interact with the user interface 440 to obtain the user preferences.

As another example, a user may indicate preferences for receiving content. For example, a user may desire to have content from specified sources downloaded to a mobile device based on one or more criteria. For example, the user may want to have images from specified sources created within a specified time period (e.g., the last day, few days, week, few weeks, or other time period) downloaded to the mobile device.

As another example, a user may want to have images related to certain subject matter downloaded to the mobile device. For example, a user may want to have images that are related to a hobby, current news, area of interest, work-related topic, and the like. To obtain such images, the user may provide key words, select from pre-defined categories, or the like.

A user may specify when downloaded content may be automatically deleted according to a policy. For example, a user may specify a timeout period, may indicate a desired size (e.g., storage size) used to store content and indicate a first-in-first-deleted preference where older content is deleted before newer content, may permanently pin certain content in memory while allowing other content to be deleted, may indicate that content created on the device be maintained according to one preference while content downloaded from other devices be deleted according to specified rules, may specify other rules for deleting content, and the like.

In conjunction with obtaining or modifying the user preferences, the configuration manager 415 may access the preferences in the store 445. In one embodiment, the store 445 may include a registry or other database that provides access to the preferences.

The monitor 420 is a component that determines whether new content is available to upload to the service. The monitor 420 may register to receive notification of new content with an operating system, application, or other component of the apparatus 405. When new content is available (e.g., a user takes a picture), the monitor 420 may be informed of this event. Alternatively, the monitor may periodically check in a storage location or with the operating system, application, or other component to determine whether new content is available.

When the monitor 420 determines that new content is available for uploading to the service, the monitor 420 may store an identifier of the new content on the store 445. One suitable identifier comprises a path of a file that includes the new content although other identifiers may also be used without departing from the spirit or scope of aspects of the subject matter described herein.

In conjunction with storing the identifier on the store 445, the monitor 420 may also store one or more destinations to which to send the new content. In one embodiment, the monitor 420 may store a separate record for each destination to which the new content is to be sent. Each record may include an identifier of the new content together with a destination to which to send the new content. The monitor 420 may retrieve destinations to which the new content is to be sent by accessing the user preferences previously stored on the store 445.

The monitor 420 may store additional information in a record depending on the intended destination of an image. For example, when sending an image to an online service, the monitor may store a URL in the record. The URL may indicate a location on the destination at which the image is to be uploaded.

As some other examples, the monitor 420 may store a date of the image such as the date the image was created, a caption associated with the image, a description associated with the image, a size of the image, a location (e.g., GPS coordinates) at which the images was created, other data about the image, and the like depending on the intended destination for the image. Some destinations, for example, may use or display this additional information.

In conjunction with storing a new record pertaining to new content that is available for uploading, the monitor 420 may then determine if the upload manager 425 is executing. If the upload manager 425 is sleeping, the monitor 420 may wake the upload manger 425. If the upload manager 425 is already executing, the monitor 420 may wait for or process the next image after storing the new record.

When executing, the upload manager 425 may check the store 445 to determine if any content needs to be uploaded to the service. If there is no content that needs to be uploaded, the upload manager 425 may enter a sleep state. If there is content that needs to be uploaded, the upload manager 425 may attempt to upload the content to the service.

To determine whether there is content that needs to be uploaded, the upload manager 425 may access a database, queue, or other data structure stored on the store 445. This database, queue, or other data structure is sometimes referred to as a data source. If the data source is empty or includes only already-sent content, the upload manager 425 may determine that there is no new content. If the data source is not empty and includes items that need to be uploaded, the upload manager 425 may obtain a record and attempt to upload the content associated with the record to the service.

Before uploading the content, the upload manager 425 may package the content such that it is in an acceptable form for the service. In one embodiment, the upload manager 425 may also put a destination identifier in the package to upload to the service. In this embodiment, the upload manager 425 may upload a different package for each intended destination.

In another embodiment, if there is more than one destination to which the content is to be delivered, the upload manager 425 may place multiple destination identifiers in the package to upload to the service. In this embodiment, the upload manager 425 may upload a single package that is to be sent to multiple destinations.

The upload manager 425 may also encode one or more type identifiers in an outgoing package. A type identifier may identify a service associated with a destination device. For example, a type identifier may indicate whether the uploaded package is to be delivered to an online service or a home computer. In some embodiments, a type identifier and destination identifier may be merged.

In addition, the upload manager 425 may also tag an outgoing package with one or more attributes. The tags may be used in certain situations and ignored in other situations.

The download manager 430 may obtain content from sources outside of the apparatus 405. These sources are sometimes referred to as "image sources." The download manager 430 may use push or pull techniques to determine that the content is available and/or to obtain the content. In a push technique, an external service may inform the download manager 430 that new content (e.g., a picture) is available and may then send the new content to the download manager 430. In a pull technique, the download manager 430 may periodically poll the service to query whether any new content is available for downloading to the apparatus 405. When new content is available for downloading to the apparatus 405, the download manager 405 may download the new content and place it in the store 445.

The download manager 430 may also follow user preferences in obtaining content. For example, the download manager 430 may obtain images created during a specified time period and may reject or not download images created outside the time period. The download manager 430 may stream the content onto the apparatus 405 in groups of images. In conjunction with or after a user has viewed one group of images, the download manager 430 may begin downloading another group of images and, if needed, may delete previously downloaded images to free memory for the new group of images. For example, the download manager 430 may use a prediction algorithm to determine when to start downloading the next group.

One exemplary prediction algorithm may indicate that the next group of images is to be downloaded when a user has viewed 50% of the current group. Another exemplary prediction algorithm may indicate that the next group of images is to be downloaded when a user has viewed the $N^{th}$ image from the end of the current group, where N is configurable or fixed. The examples of prediction algorithms above are not intended to be all-inclusive or exhaustive. Indeed, based on the teachings herein, those skilled in the art may recognize many other prediction algorithms that may be used without departing from the spirit or scope of aspects of the subject matter described herein.

The error manager 435 may be responsible for translating errors in uploading or downloading into a form suitable for presenting to a user. Errors may occur at any of various points in attempting to upload or download an image. For example, an error (e.g., out of memory) may occur on the apparatus, an error (e.g., a network failure) may occur in communicating with the service 310, an error may occur within the service 310 or one of its associated components, or an error may occur in forwarding the message to its intended destination.

In dealing with possibly many different destinations, the apparatus 405 may encounter many different types of errors that may be phrased in technical or non-consistent ways. The error manager 435 may receive an identifier of the error (e.g., some error code and possibly the destination or component that generated the error), and/or text associated with the error and may translate the identifier and/or text into an error message understandable by a user of the apparatus 405.

Returning to FIG. 3, the forwarding/transformation service 310 (hereinafter service 310) may comprise a set of one or more processes (sometimes referred to herein as a "service") that are responsible for forwarding content to and/or transforming content to a suitable form for the target(s) 315. These one or more processes may reside on one or more physical and/or virtual machines. The service 310 receives uploaded packages from the source device 305 and puts them in the appropriate form(s) for placing on the target(s) 315. In one embodiment, the service 310 may reside on a consumer electronic device that exposes APIs that the source device 305 may call to forward content to the target(s) 315. In one embodiment, the service 310 and at least one of the target(s) 315 may reside on the same device.

To determine an appropriate target, the service 310 may retrieve the destination received in the uploaded content. The service 310 may have a table or other appropriate data structure that associates destinations with targets.

The service 310 may impersonate the user when forwarding the content to a target. In impersonating the user, the service 310 may supply credentials of the user to access a service of the target. In response, the service 310 may obtain a token (e.g., a long string) that the service 310 may provide to the target subsequently to impersonate the user. The service 310 may store the token on a store local to the service 310. To initially obtain user credentials, a user may provide some credentials (e.g., user name and password) to the service 310 via a user interface. This user interface may reside on the source device 305, one or more of the target(s) 315, on another device not illustrated in FIG. 3, or elsewhere.

The service 310 may have a pluggable architecture in which the service 310 can be expanded to different targets by adding a translation/forwarding component suitable for the target. If needed (e.g., based on load, bandwidth, or for other reasons), each pluggable component may be installed on a separate server. A pluggable component may be responsible for translating content from an uploaded form to a form appropriate for the destination.

Translating may include transforming the format of the image. For example, one destination may support images of a certain type (e.g., JPG) while another destination may support images of another type (e.g., GIF). Translating may also include changing the size or resolution of an image, changing bit rate, other transcoding, and the like. For example, when a target is a device connected via a low bandwidth or relatively expensive network, a high resolution image may be translated into a lower resolution image or cropped to conserve bandwidth.

In addition, the pluggable component may be responsible for communicating with a service of the target. Services of different types of targets (e.g., online, mobile, home computer, and the like) may vary.

It is possible that the source device 305 will support a destination that the service 310 does not support. For example, the service 310 may be an earlier version that does not recognize newer destinations supported by the source device 305. In this case, the source device 305 may first determine what destinations are supported by the service 310 before attempting to upload content to the service 310.

To determine what pluggable component to use, the service 310 may read the type identifier(s), tags, and/or destination address included in a package uploaded from the source device 305 to the service 310. The service 310 may have a table or other data structure that associates the type identifier(s), tags, and/or destination address with a particular pluggable component. Furthermore, the pluggable component may make additional decisions based on the type identifier(s), tags, and/or destination address.

Messages sent between the source device 305 and the service 310 and the service 310 and the target(s) 315 may be encrypted using any suitable encryption algorithm.

Figure 5:
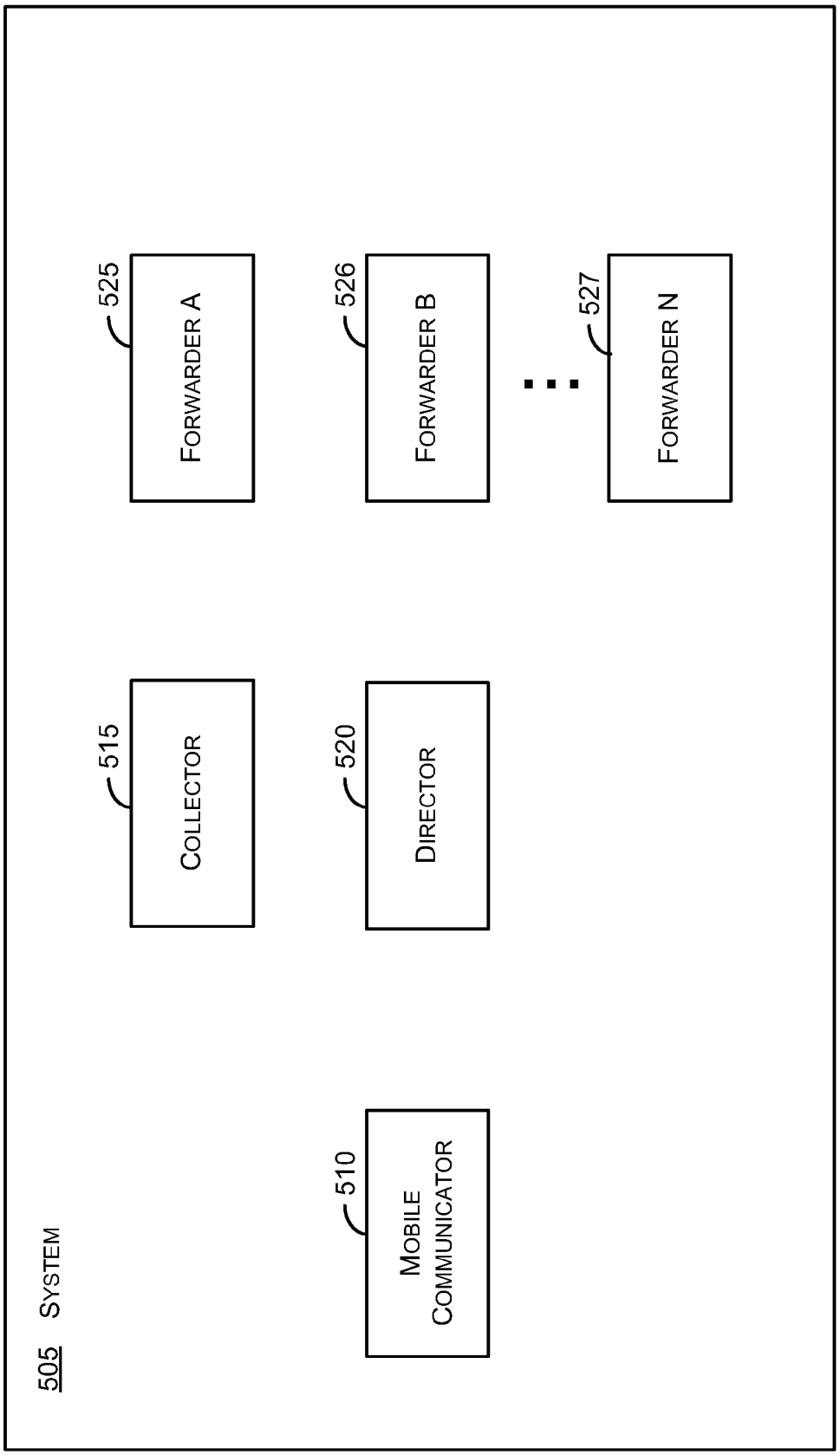
FIG. 5 is a block diagram that includes exemplary components of a system that may implement the service 310 in accordance with aspects of the subject matter described herein.

FIG. 5 is a block diagram that includes exemplary components of a system that may implement the service 310 in accordance with aspects of the subject matter described herein. The system 505 may implement the service 310 of FIG. 10. The system 505 includes a mobile communicator 510, a collector 515, a director 520, forwarders 525-527, and may also include other components (not shown). The mobile communicator 510, collector 515, director 520, and forwarders 525-527 are sometimes referred to herein as components of the system 505 or simply components.

The components of the system 505 may be hosted on one or more devices. Each component may be hosted on a separate device or two or more of the components may be hosted on individual devices. Whether more than one device is used to host the components may be determined based on load, bandwidth, or for other reasons as mentioned previously.

If on separate devices, the components of the system 505 may communicate with each other via one or more networks including intra- and inter-office networks, telephone lines, the network 220, wireless networks 221 and 222, other wireless and wired networks, and the like.

If on the same device, components of the system 505 may communicate via intra-process, inter-process, network, or other communication mechanism.

The mobile communicator 510 is operable to receive upload packages from mobile devices. These upload packages include images from the mobile devices. Each upload package indicates a destination to which an image of the upload package is to be delivered as previously described.

The mobile communicator 510 may be further operable to provide download packages that include images from designated destinations to the mobile devices. As described previously, a user may configure download settings to allow a mobile device to obtain content from source external to the mobile device (e.g., such as the destinations to which the mobile device sends images).

The collector 515 may be operable to determine whether a new image is available from a destination device. The collector 515 may do this by using a forwarder to poll the destination device or may receive a message from a destination device when a new image is available from the destination device. When an image is available, the collector may further operate to instruct a forwarder to obtain the new image. The collector may then provide the image to the mobile communicator 510 so that the mobile communicator 510 may provide the image to a mobile device.

The director 520 is operable to determine a forwarder to transmit a message to a target associated with a destination. After determining the appropriate forwarder, the director 520 may provide an upload package or data derived therefrom to the forwarder for transmitting an image and associated data to the target.

The forwarders 525-527 may be operable to transmit images to and from target devices. The forwarders 525-527 may use different protocols to transmit these images. For example, a forwarder may use a protocol tailored for communicating with an online service when transmitting an image to a device associated with the online service. This protocol may involve impersonating a user by providing a token, sending data and receiving data according to specified patterns appropriate for the online service, and so forth.

When a forwarder communicates with a home computer, the forwarder may use a different protocol tailored for communicating with a service hosted on the home computer. This protocol may specify how and when data is to be transferred between the forwarder and the computer.

The protocol to obtain an image from a destination may be different from the protocol to provide an image to the destination. In other words, a different set of actions may occur in obtaining an image from a destination than when sending an image to the destination.

A forwarder may create a new package when sending a message to a destination. The new package may be derived from an uploaded package and may be formatted in a manner appropriate for the destination.

The director 520 may be further operable to allow new forwarders to be "plugged in" to the system 505. To plug a new forwarder into the system, a software developer or the like may install the forwarder and inform the director 520 of the availability of the new forwarder. The software developer may also indicate destinations or types of services that are associated with the new forwarder. For example, if a new social networking site becomes available, a developer may develop a forwarder that is capable of uploading images to and downloading images from the new social networking site. The developer may then plug this forwarder into the system 505 and notify the director 520 of the new forwarder.

Returning to FIG. 3, the target(s) 315 may host an online service such as Windows Live Services, a social networking service such as FaceBook, MySpace, LinkedIn, or other social networking service, an image hosting service that allows uploading of images including video, a photo sharing service, service(s) hosted on home, mobile device, or other computer(s), or any other service that allows content to be uploaded. The examples of services above are not intended to be all-inclusive or exhaustive. Indeed, based on the teachings herein, those skilled in the art may recognize many other services that the target(s) 315 may host images without departing from the spirit or scope of aspects of the subject matter described herein.

Although the environment described above in conjunction with FIG. 3 includes various numbers of each of the entities and related infrastructure, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 6:
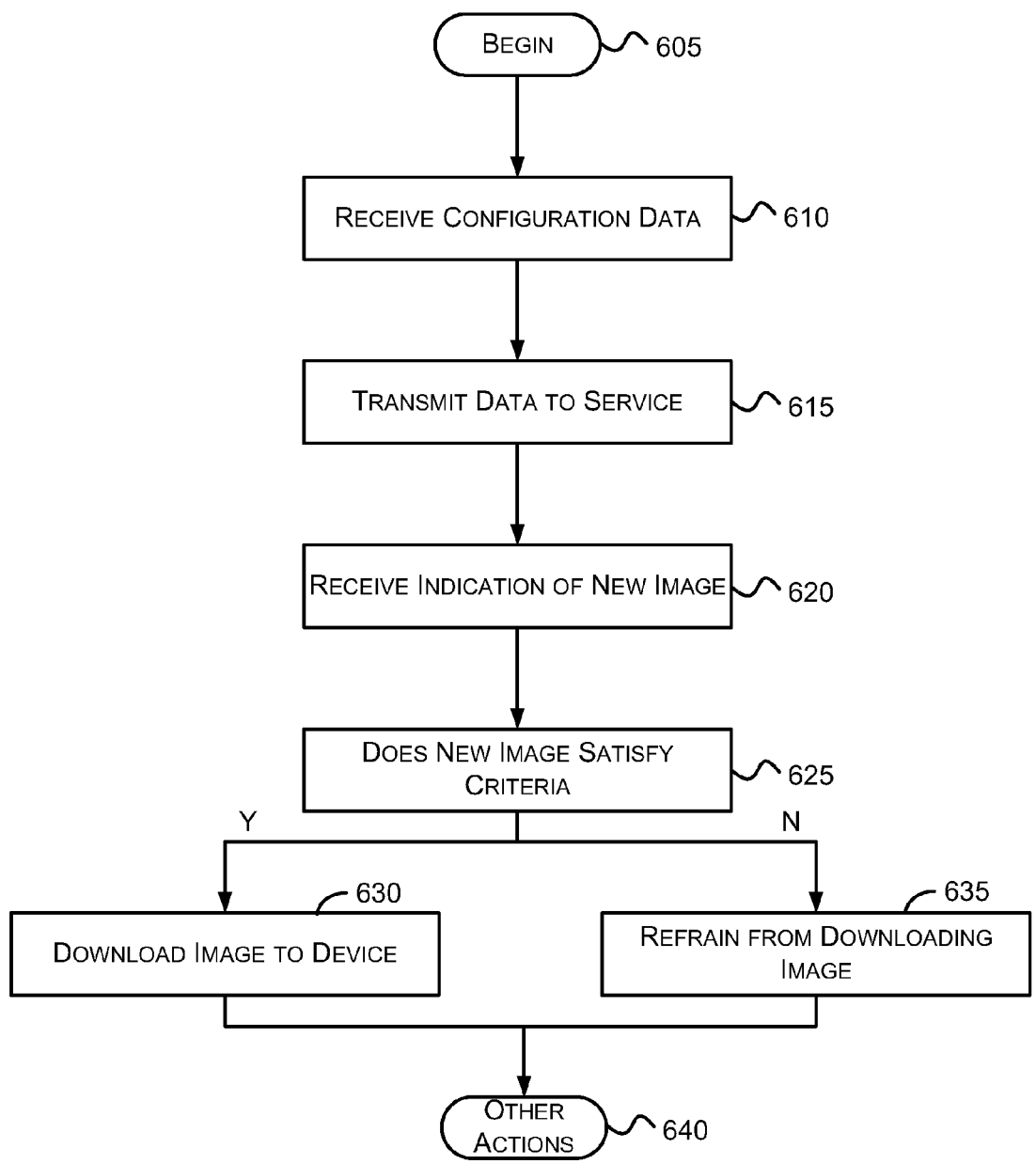
FIG. 6 is a flow diagram that generally represents exemplary actions that may occur when content is downloaded to a device in accordance with aspects of the subject matter described herein.

FIGS. 6-7 are flow diagrams that generally represent actions that may occur in accordance with aspects of the subject matter described herein. For simplicity of explanation, the methodology described in conjunction with FIGS. 6-7 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 6 is a flow diagram that generally represents exemplary actions that may occur when content is downloaded to a device in accordance with aspects of the subject matter described herein. At block 605, the actions begin.

At block 610, configuration data is received. The configuration data indicates a plurality of external image sources from which to obtain images for a mobile device. At least two of the image sources have different communication protocols for providing images. The mobile device is configured to send new images created using the mobile device to at least one of the image sources For example, referring to FIGS. 2 and 4, the configuration manager 415 may receive configuration input via the user interface 440. The input may indicate that an online service associated with the server(s) 205 and one or more of the computer(s) 206 are to act as image sources to the mobile device 215. The online service may also be configured to be a destination for new images created using the mobile device 215.

At block 615 information regarding the image sources is transmitted to a service that is responsible for obtaining the images from the image sources and providing access to the obtained images to the mobile device. For example, referring to FIG. 2, the source device 305 may indicate which target(s) 315 are to also act as image source to the source device 305. For example, referring to FIG. 2, the mobile device 215 may inform a service to include one or more of the computer(s) 206 as images sources to the mobile device 215.

At block 620, an indication that a new image from one of the image sources is available is received. This indication may be received by querying the service as to whether any new images are available, receiving a message from the service that a new image is available, or some similar technique. For example, referring to FIG. 4, the download manager 430 may receive a message that a new image is available.

At block 625, a determination is made as to whether the new image satisfies one or more criteria for downloading the image. Referring to FIG. 4, the download manger 430 may determine whether the new image satisfies one or more criteria. For example, if the new image was created within the last day, this may satisfy a time period criterion. If the image relates to a specified subject matter as indicated by a caption or text associated with the image, this may satisfy a subject matter criterion.

If the new image satisfies the one or more criteria, the actions continue at block 630; otherwise, the actions continue at block 635.

At block 630, the new image is downloaded to the mobile device. For example, referring to FIG. 2, the content sharing components 228 of the mobile device 215 may download a new image from a home computer (e.g., the computer(s) 206) to the mobile device 215.

As mentioned previously, the new image may be downloaded in a stream that includes the new image and other images. The timing for commencing receiving the stream may be based on receiving input indicative of viewing images in a previously downloaded group of images. For example, when a user begins viewing previously-downloaded images, this may trigger obtaining another group of images.

At block 635, a download does not occur. For example, referring to FIG. 2, the content sharing components 228 refrain from downloading the new image.

At block 640, other actions, if any, are performed. For example, images on the mobile device may be deleted according to policies as described previously.

FIG. 7 is a flow diagram that generally represents exemplary actions that may occur when content is uploaded from a mobile device in accordance with aspects of the subject matter described herein. At block 705, the actions begin.

At block 710, user preferences are received and stored. As mentioned previously, the user preferences may indicate whether images are to be automatically uploaded and may also indicate one or more external destinations to which the images are to be sent if uploaded. In conjunction with receiving the user preferences, configuration data may be updated to reflect the user preferences. This configuration data may be stored on a store of the mobile device.

For example, referring to FIG. 4, the user interface 440 may allow a user to indicate user preferences. The configuration manager 415 may use these user preferences to update configuration data and may then store the configuration date on the store 445 for subsequent use.

At block 715, an indication is received indicating of an image that has been created using a mobile device. For example, referring to FIG. 4, the monitor 420 may determine that a user has taken a new picture using a camera of the apparatus 405.

At block 720, a determination is made as to whether the new image is to be uploaded to a service. This may involve obtaining configuration data that indicates whether the image is to be automatically uploaded to the service external. If the image is to be automatically uploaded to the service, the configuration data may also indicate one or more destinations to which the image is to be sent.

At block 725, a package that includes the image is created. The package indicates a destination for the image. For example, referring to FIG. 4, the upload manager 425 may create a package that includes the image and indicates a destination for the image.

At block 730, based on the destination, a determination is made as to whether to add additional fields, if any, to the package. As mentioned previously, the additional fields may provide additional information about the image. For example, referring to FIG. 4, if the image is going to be sent to an online service, the upload manager 425 may add location or other information about the image to the package.

At block 735, the package is transmitted to the service. If a network connection is not available, the image or package may be stored on the mobile device until a network becomes available. The service is then responsible for communicating with a target device of the destination to provide the image to the target device. The service may be configured to impersonate a user of the mobile device in communicating with the target device of the destination.

At block 740, other actions, if any may be performed.

Blocks 745 and 750 indicate other actions that may be performed at various times in conjunction with the other actions indicated in FIG. 7.

At block 745, user credentials may be provided to the service so that the service may impersonate a user when the service communicates with the target device of the destination. For example, a user name and password or other credentials may be supplied to the service.

At block 750, errors may be dealt with as described previously. For example, error handling may include:

1. Receiving an indication of an error in sending the image to the destination. The indication may include for example, an error code that occurred in transmitting the image from the service to the destination;

2. Determining an error message to show on a display of the mobile device in response to receiving the indication of an error. Determining this error message to show may be performed as described previously; and 3. Displaying the error message on the display of the mobile device.

As can be seen from the foregoing detailed description, aspects have been described related to content sharing for mobile devices. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

receiving configuration data that indicates a plurality of image sources from which to obtain images for a mobile device, the image sources being external to the mobile device, at least two of the image sources having different communication protocols for providing images, the mobile device configured to send new images created using the mobile device to at least one of the image sources;

transmitting information regarding the image sources to a service that is responsible for obtaining the images from the image sources and providing access to the obtained images to the mobile device;

receiving an indication that a new image from one of the image sources is available;

determining whether the new image satisfies one or more criteria for downloading the new image;

if the new image satisfies the one or more criteria, downloading the new image to the mobile device, downloading the new image to the mobile device including commencing receiving a stream that includes the new image and other images after receiving input indicative of viewing images in a previously downloaded group of images, the input indicative of viewing images in the previously downloaded group of images indicating at least a percentage of the group of images has been viewed; and if the new image does not satisfy the one or more criteria, refraining from downloading the new image.

2. The method of claim 1, wherein receiving an indication that a new image is available from one of the image sources comprises querying the service as to whether any new images are available.

3. The method of claim 1, wherein receiving an indication that a new image is available from one of the image sources comprises receiving a message from the service that indicates that the new image is available.

4. The method of claim 1, wherein determining whether the new image satisfies one or more criteria for downloading the new image comprises determining whether the new image was created within a specified time period.

5. The method of claim 1, wherein determining whether the new image satisfies one or more criteria for downloading the new image comprises determining whether the new image is associated with text of an indicated subject matter.

6. The method of claim 1, wherein the input indicative of viewing images in the previously downloaded group of images indicates only a preset number of the group of images have not been viewed.

7. The method of claim 1, further comprising automatically deleting the image from the mobile device according to a policy.

8. A computer storage medium having computer-executable instructions, which when executed perform actions, comprising:

receiving configuration data that indicates a plurality of image sources from which to obtain images for a mobile device, the image sources being external to the mobile device, at least two of the image sources having different communication protocols for providing images, the mobile device configured to send new images created using the mobile device to at least one of the image sources;

transmitting information regarding the image sources to a service that is responsible for obtaining the images from the image sources and providing access to the obtained images to the mobile device;

receiving an indication that a new image from one of the image sources is available;

determining whether the new image satisfies one or more criteria for downloading the new image;

if the new image satisfies the one or more criteria, downloading the new image to the mobile device, downloading the new image to the mobile device including commencing receiving a stream that includes the new image and other images after receiving input indicative of viewing images in a previously downloaded group of images, the input indicative of viewing images in the previously downloaded group of images indicating at least a percentage of the group of images has been viewed; and if the new image does not satisfy the one or more criteria, refraining from downloading the new image.

9. The computer storage medium of claim 8, wherein receiving an indication that a new image is available from one of the image sources comprises querying the service as to whether any new images are available.

10. The computer storage medium of claim 8, wherein receiving an indication that a new image is available from one of the image sources comprises receiving a message from the service that indicates that the new image is available.

11. The computer storage medium of claim 8, wherein determining whether the new image satisfies one or more criteria for downloading the new image comprises determining whether the new image was created within a specified time period.

12. The computer storage medium of claim 8, wherein determining whether the new image satisfies one or more criteria for downloading the new image comprises determining whether the new image is associated with text of an indicated subject matter.

13. The computer storage medium of claim 8, wherein the input indicative of viewing images in the previously downloaded group of images indicates only a predetermined number of the group of images have not been viewed.

14. The computer storage medium of claim 8, further comprising automatically deleting the image from the mobile device according to a policy.

15. A system comprising:
at least one processor operable to provide:
a configuration data receiver configured to receive configuration data that indicates a plurality of image sources from which to obtain images for a mobile device, the image sources being external to the mobile device, at least two of the image sources having different communication protocols for providing images, the mobile device configured to send new images created using the mobile device to at least one of the image sources;

a transmitter configured to transmit information regarding the image sources to a service that is responsible for obtaining the images from the image sources and providing access to the obtained images to the mobile device;

an indication receiver configured to receive an indication that a new image from one of the image sources is available;

a determiner configured to determine whether the new image satisfies one or more criteria for downloading the new image; and a downloading unit configured to, if the new image satisfies the one or more criteria, downloading the new image to the mobile device, download the new image to the mobile device including commencing receiving a stream that includes the new image and other images after receiving input indicative of viewing images in a previously downloaded group of images, the input indicative of viewing images in the previously downloaded group of images indicating at least a percentage of the group of images has been viewed, the downloading unit being further configured to, if the new image does not satisfy the one or more criteria, refrain from downloading the new image.

16. The system of claim 15, wherein the indication receiver is configured to query the service as to whether any new images are available.

17. The system of claim 15, wherein the indication receiver is configured to receive a message from the service that indicates that the new image is available.

18. The system of claim 15, wherein the determiner is configured to determine whether the new image was created within a specified time period.

19. The system of claim 15, wherein the determiner is configured to determine whether the new image is associated with text of an indicated subject matter.

20. The system of claim 15, wherein the input indicative of viewing images in the previously downloaded group of images indicates only a specific number of the group of images have not been viewed.

* * * * *